(12) United States Patent
Vaananen et al.

(10) Patent No.: US 10,120,772 B2
(45) Date of Patent: *Nov. 6, 2018

(54) OPERATION OF I/O IN A SAFE SYSTEM

(71) Applicant: Artesyn Embedded Computing, Inc., Tempe, AZ (US)

(72) Inventors: Pasi Jukka Petteri Vaananen, Waltham, MA (US); Martin Peter John Cornes, Phoenix, AZ (US); Shlomo Pri-Tal, Phoenix, AZ (US)

(73) Assignee: Artesyn Embedded Computing, Inc., Tempe, AZ (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/651,023

(22) Filed: Jul. 17, 2017

(65) Prior Publication Data
US 2017/0315896 A1 Nov. 2, 2017

Related U.S. Application Data

(63) Continuation of application No. 14/219,043, filed on Mar. 19, 2014, now Pat. No. 9,747,184.
(Continued)

(51) Int. Cl.
*G06F 11/00* (2006.01)
*G06F 11/30* (2006.01)
(Continued)

(52) U.S. Cl.
CPC ...... *G06F 11/3055* (2013.01); *G06F 11/0739* (2013.01); *G06F 11/0757* (2013.01);
(Continued)

(58) Field of Classification Search
CPC .................. G06F 11/3055; G06F 11/0739
See application file for complete search history.

(56) References Cited

U.S. PATENT DOCUMENTS 6,249,885 B1 * 6/2001 Johnson ............... G06F 1/20
714/47.2
6,370,656 B1 * 4/2002 Olarig ............. G06F 11/0721
709/201
(Continued)

FOREIGN PATENT DOCUMENTS

CN 101779193 A 7/2010

OTHER PUBLICATIONS

English Translation of Chinese Office Action for Application No. 201410418147.2 dated May 11, 2018.
(Continued)

*Primary Examiner* — Marc Duncan
*Assistant Examiner* — Jonathan D Gibson
(74) *Attorney, Agent, or Firm* — Harness, Dickey & Pierce, P.L.C.

(57) ABSTRACT

A module health system includes a module health circuit comprising a hardware register that is set to a first value in response to the system starting, an application register that is set to the first value in response to the system starting and a watchdog timer register that is set to the first value in response to the system starting. The system further includes a power on self-test that determines whether the system has passed a plurality of tests and that selectively sets the hardware register to a second value based on the determination, an external software application that determines whether a safety critical system is healthy and selectively sets the application register based on the determination, a watchdog timer application that selectively sets the watchdog timer register, a central processing unit that determines whether to de-assert a module health signal.

30 Claims, 4 Drawing Sheets

Related U.S. Application Data

(60) Provisional application No. 61/916,410, filed on Dec. 16, 2013.

(51) Int. Cl.
   *G06F 11/22* (2006.01)
   *G06F 11/34* (2006.01)
   *G06F 11/16* (2006.01)
   *G06F 11/07* (2006.01)
   *G06F 11/20* (2006.01)

(52) U.S. Cl.
   CPC ...... *G06F 11/1633* (2013.01); *G06F 11/1654* (2013.01); *G06F 11/2284* (2013.01); *G06F 11/3495* (2013.01); *G06F 11/1608* (2013.01); *G06F 11/202* (2013.01); *G06F 11/2038* (2013.01); *G06F 2011/2278* (2013.01)

(56) References Cited

U.S. PATENT DOCUMENTS

| | | | | |
|---|---|---|---|---|
| 7,197,666 | B1* | 3/2007 | Yin | G06F 11/0751 714/10 |
| 8,509,963 | B1* | 8/2013 | Barnes | G06F 11/3013 340/540 |
| 8,554,953 | B1* | 10/2013 | Sorensen | A61B 7/04 710/2 |
| 2002/0133693 | A1* | 9/2002 | Morrison | G06F 9/4405 713/1 |
| 2003/0236880 | A1* | 12/2003 | Srivastava | G06F 11/326 709/224 |
| 2004/0148130 | A1* | 7/2004 | Scott | G05B 23/027 702/183 |
| 2004/0153786 | A1* | 8/2004 | Johnson | G06F 1/26 714/25 |
| 2005/0132032 | A1* | 6/2005 | Bertrand | H04L 41/046 709/223 |
| 2005/0152384 | A1* | 7/2005 | Chong | H04L 47/15 370/412 |
| 2006/0036879 | A1* | 2/2006 | Wahler | G06F 1/206 713/300 |
| 2006/0229777 | A1* | 10/2006 | Hudson | G01M 15/05 701/31.4 |
| 2007/0170909 | A1* | 7/2007 | Vorenkamp | G06F 1/266 324/76.11 |
| 2007/0288741 | A1* | 12/2007 | Ikedo | G06F 9/4403 713/2 |
| 2008/0164987 | A1* | 7/2008 | Bauerle | B60W 50/02 340/439 |
| 2009/0164059 | A1* | 6/2009 | Takeda | B60W 50/04 701/31.4 |
| 2010/0049268 | A1* | 2/2010 | Martins | G06F 11/2025 607/9 |
| 2010/0257343 | A1* | 10/2010 | Klug | G06F 21/75 712/227 |
| 2011/0072313 | A1* | 3/2011 | Fuhrmann | G06F 11/0739 714/47.1 |
| 2011/0283033 | A1* | 11/2011 | Yamada | G06F 11/1641 710/261 |
| 2012/0046900 | A1* | 2/2012 | Baert | B61F 5/24 702/141 |
| 2013/0018885 | A1* | 1/2013 | Guenkova-Luy | G06F 11/0739 707/737 |
| 2013/0073891 | A1* | 3/2013 | Boehl | G06F 11/0739 713/502 |
| 2013/0159690 | A1* | 6/2013 | Tsukamoto | G06F 1/26 713/2 |
| 2013/0227333 | A1* | 8/2013 | Furukoshi | G06F 11/0757 714/2 |
| 2014/0164826 | A1* | 6/2014 | Aoki | G06F 11/0739 714/10 |
| 2015/0169424 | A1* | 6/2015 | Vaananen | G06F 11/3055 714/36 |

OTHER PUBLICATIONS

Chinese Office Action for Application No. 201410418147.2, dated Dec. 12, 2017.

Chinese Office Action for Application No. 201410418147.2 dated May 2, 2017, and an English language translation thereof.

* cited by examiner

OPERATION OF I/O IN A SAFE SYSTEM

CROSS-REFERENCE TO RELATED APPLICATIONS

This application is a continuation of U.S. patent application Ser. No. 14/219,043 filed on Mar. 19, 2014, which claims the benefit of U.S. Provisional Application No. 61/916,410, filed on Dec. 16, 2013. The entire disclosures of each of the above applications are incorporated herein by reference.

FIELD

The present disclosure relates to fault-tolerant failsafe computer systems.

BACKGROUND

This section provides background information related to the present disclosure which is not necessarily prior art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An external safety system, such as a railway system, may include fault-tolerant failsafe computer systems configured to implement a safety application. The fault-tolerant failsafe computer systems may include a plurality of hardware components electrically and logically coupled in order to implement the safety application. The safety application selectively communicates with safety critical hardware and software. The safety critical hardware and software are configured to control safety relevant functions of the railway system.

For example, a train riding on the railway system includes a braking system. The braking system is configured to implement at least one safety relevant function, such as a braking function. The braking system includes a brake and software configured to actuate the brake. The software receives instructions to actuate the brake. For example, an operator of the train may operate a braking system user interface in order to instruct the software to actuate the brake. Periodically, an erroneous instruction to actuate the brake may be generated by a faulty component of the railway system. Accordingly, a fault-tolerant failsafe computer system configured to validate instructions received by external safety systems is desired.

SUMMARY

This section provides a general summary of the disclosure, and is not a comprehensive disclosure of its full scope or all of its features.

A module health system includes a module health circuit. The module health circuit includes a hardware (HW) register that is set to a first value in response to the system starting. The module health circuit further includes an application register that is set to the first value in response to the system starting and a watchdog (WD) timer register that is set to the first value in response to the system starting.

The system further includes a power on self-test (POST) that determines whether the system has passed a plurality of tests and that selectively sets the HW register to a second value based on the determination and an external software application that determines whether a safety critical system is healthy and selectively sets the application register based on the determination. The system further includes a watchdog timer application that selectively sets the WD timer register in response to receiving a watchdog signal and a central processing unit (CPU) that determines whether to de-assert a module health signal based on a value of the HW register, the application register, and the WD timer register.

In other features, a method includes setting, in response to a module health system starting, a hardware (HW) register to a first value, setting, in response to the system starting, an application register to the first value, setting, in response to the system starting, a watchdog (WD) timer register, selectively setting the HW register to a second value in response to a determination of whether the system has passed a plurality of tests, selectively setting the application register to the second value in response to a determination of whether a safety critical system is healthy, selectively setting the WD timer register to the second value in response to receiving a watchdog signal, and determining whether to de-assert a module health signal based on a value of the HW register, the application register, and the WD timer register Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
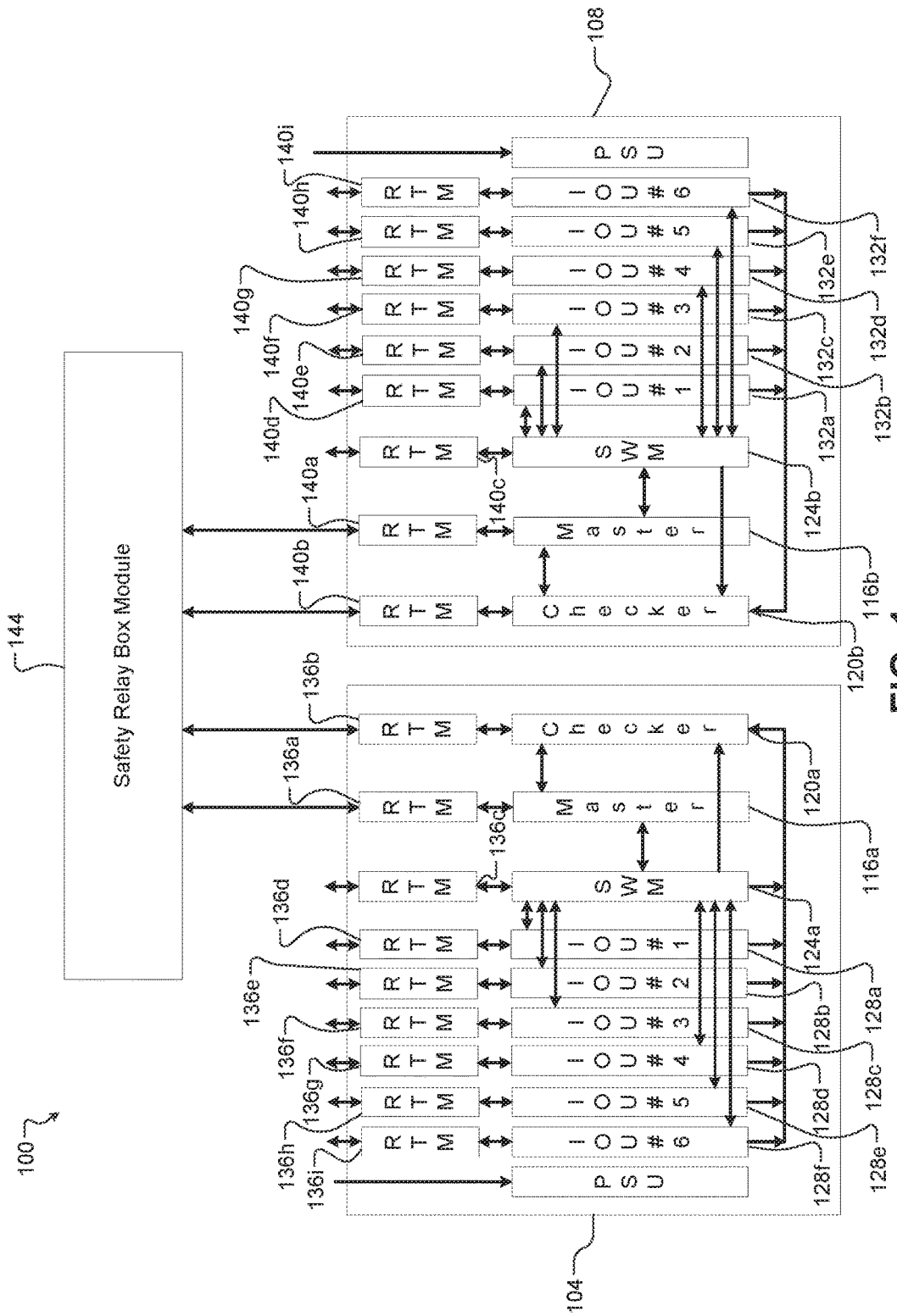
FIG. 1 is a functional block diagram of a fault-tolerant failsafe computer system according to the principles of the present disclosure.

Referring now to FIG. 1, a functional block diagram of an exemplary fault-tolerant failsafe computer system 100 is shown. The system 100 is arranged to interact with safety applications. For example, the system 100 is arranged to communicate with safety critical hardware and software associated, by way of non-limiting example, a railway system. The safety critical hardware and software control safety relevant components of the railway system. For example, the safety critical hardware may be coupled to a brake system of a train operating on the railway system. Further, the system 100 may be capable of being certified according to an industry recognized safety standard.

The safety critical hardware receives data elements from the safety critical software to actuate a brake of the brake system. The system 100 interfaces with the safety critical hardware and software to ensure the safety critical hardware and software are operating according to a predetermined operating standard. It is understood that while only a brake system of the train is described, the principles of the present disclosure apply to any safety critical hardware and software. Other possible applications for the embodiments described herein include, but are not limited to, components of an airline system, components of a medical treatment system, components of an oil and gas control system, components of a smart grid system, and components of various manufacturing systems.

In some implementations, the system 100 receives a plurality of incoming data packets from an external safety system, such as the railway system. The system 100 is configured to process the plurality of incoming data packets and communicate a plurality of outgoing data packets to safety relevant components of the external safety system. For example, the system 100 determines whether a first packet of the plurality of incoming data packets is a valid packet. When the system 100 determines the first packet is a valid packet, the system 100 communicates an outgoing packet to at least one safety relevant component of the railway system.

The first packet includes data elements to be acted on by the at least one safety relevant component of the railway system. The data elements may include sensor data and/or input/output (I/O) point states. The at least one safety relevant component may be a brake coupled to a train riding on the railway system. It is understood that while only safety relevant components of the external safety system are described, the first packet may include data elements to be acted on by non-safety relevant components of the external safety system. The data elements are formatted according to a transfer protocol. For example, the railway system is configured to package the data elements according to a predetermined packaging standard into transferable packets. The railway system then transfers the plurality of incoming data packets according to the transfer protocol.

The system 100 is arranged to receive packets transmitted according to the transfer protocol. Further, the system 100 is configured to interpret the predetermined packaging standard. The system 100 then extracts the data elements from the first packet and generates an outgoing data packet based on the data elements. The outgoing data packet includes a set of instructions based on the data elements. While only instructions are discussed, the outgoing data packet may also include operating instruction to control I/Os, a request to read an input in order to gather information, health message communications, a request for inter-process communication, or other suitable elements. The set of instructions includes at least one instruction that instructs at least one of the safety critical hardware and software to execute a procedure.

For example, the set of instructions may instruct the safety critical software to execute a braking procedure. The braking procedure includes hardware braking instructions. The hardware braking instructions are communicated to the safety critical hardware. The safety critical hardware executes the braking instructions. For example, the safety critical hardware applies a brake.

The system 100 determines whether to communicate the outgoing data packet and data elements to the safety critical hardware and software. For example, the system 100 ensures each of the plurality of incoming data packets meet a predetermined safety standard. The predetermined safety standard includes determining whether or not the railway system is operating according to a predefined set of operating standards. The system 100 verifies that each of the plurality of incoming data packets was intentionally transferred by the railway system 100. For example only, the railway system may transfer erroneous incoming data packets due to a hardware or software fault within the railway system.

The safety critical hardware and software receives the first packet of the plurality of incoming data packets in response to a command from an operator of the railway system. The safety critical hardware and software receives a second packet of the plurality of incoming data packets due to a fault in the railway system. The fault in the railway system may include, by way of non-limiting example only, a hardware failure such as a deteriorated electrical connection due to extended exposure to heat or moisture. The safety critical hardware and software communicate the plurality of incoming data packets, including the first and second packet, to the system 100. The system 100 is configured to determine whether each of the plurality of incoming data packets was received by the safety critical hardware and software as a result of a fault in the railway system.

When the system 100 determines one of the plurality of incoming data packets was received in response to a command from the operator, the system 100 generates an outgoing data packet corresponding to the received incoming data packet. For example, the system 100 generates a first outgoing data packet based on the first packet. The first outgoing data packet includes a set of instructions corresponding to the data elements within the first packet. When the system 100 determines the first packet is a valid packet, the system 100 communicates the first outgoing data packet to the safety critical hardware and software. For example, the system 100 determines the first packet was received in response to a command from the operator. The system 100 communicates the first outgoing data packet to the safety critical hardware and software. The safety critical hardware and software execute the set of instructions included in the first outgoing data packet.

Conversely, when the system 100 determines one of the plurality of incoming data packets was received in response to a fault within the railway system, the system 100 does not communicate an outgoing data packet to the safety critical hardware and software. For example, the system 100 determines the second packet was received due to a fault in the railway system. The system 100 does not communicate an outgoing data packet corresponding to the second packet to the safety critical hardware and software. Consequently, the safety critical hardware and software do not execute instructions corresponding to data elements included in the second packet.

Further, the system 100 generates a fault indication based on the determination that a fault occurred within the railway system. In this way, data elements executed by the safety critical hardware and software are first verified by the system 100. This verification ensures the railway system is operating according to the predetermined safety standard.

In some implementations, the system 100 receives a first packet of the plurality of incoming data packets. Simultaneously, the system 100 receives a second packet of the plurality of incoming data packets. The system 100 then executes voting logic on the first and second packet. The voting logic may be implemented as a dual two-of-two (2oo2) system. The 2oo2 voting logic is explained in greater detail below. The system 100 determines whether the first and second packets are identical. When the system 100 determines the first and second packets are identical, the system 100 generates a first outgoing data packet and communicates the first outgoing data packet to at least one component of the safety critical hardware and software.

The at least one component then executes operating data elements included within the first outgoing data packet. Conversely, when the first and second packets are not identical, the system 100 identifies at least one component of the system 100 or the railway system as faulty. It is understood that while a railway system is described, the principles of the present disclosure apply to any external safety systems.

The system 100 also generates a safety indication. The safety indication may be indicative of a failure within the system 100 or the safety critical hardware and software. Further, the system 100 instructs the at least one component to operate in a predetermined safe state. For example, the safe state may include a set of safe state data elements arranged to maintain a safe operating environment of the railway system.

The safe state data elements include instructing the railway system to operate in a predetermined operating mode that ensures the overall safety of the railway system. For example only, the predetermined operating mode includes bringing a train operating on the railway system to a stop. In some implementations, the safe state includes disabling all safety relevant communication interfaces. For example, a fail-safe computer operating in a safe state is incapable of communicating with the safety critical hardware and software. In this way, the fail-safe computer operating in the safe state is incapable of incorrectly instructing the safety critical hardware and software.

The system 100 includes an active fail-safe chassis (FSC) 104 and a standby FSC 108. In order to increase availability and reliability of the system 100, the active FSC 104 and the standby FSC 108 are redundant FSCs. For example, the active FSC 104 is configured to execute any and all operations of the standby FSC 108. In this way, when one of the active FSC 104 and the standby FSC 108 encounters a hardware or software failure, the other of the active FSC 104 and the standby FSC 108 is configured to operate in place of the failed FSC.

The active FSC 104 implements a two-out-of-two (2oo2) voting architecture that detects voting mismatches and performs a failsafe operation when a voting mismatch occurs. The 2oo2 voting architecture includes dual redundant processing and voting subsystems. The redundant processing and voting subsystems vote on packets entering or leaving the active FSC 104. For example, the active FSC 104 receives a plurality of incoming data packets. The active FSC 104 receives two copies of a first packet of the plurality of incoming data packets.

The active FSC 104 determines the validity of the first packet. The active FSC 104 continuously generates a first health status signal and a second health status signal based on the determination of whether the first packet is valid. In some implementations, continuously generating a signal may include setting the signal to a first predetermined value. The continuously generated signal is then maintained at the first predetermined value until the signal is de-asserted to a second predetermined value.

The active FSC 104 compares each of the two copies of the first packet. When the two copies are identical, the active FSC 104 determines the first packet is valid. The active FSC 104 continuously generates the first health status signal and the second health status signal when the active FSC 104 determines the first packet is valid. The first and second health status signals may be asserted to a first value. In some implementations, the first value is equal to 1. In another implementation, the first value may be a string of characters that indicate the FSC 104 is healthy.

Conversely, when the active FSC 104 determines the two copies of the first packet are not identical, the active FSC 104 de-asserts the first and second health status signals. It is understood that the first and second health status signals may be de-asserted to a second value. For example, the second value may be equal to 0. In another implementation, the second value may be a string of characters that indicate the FSC 104 is not healthy. As will be described in greater detail below, the active FSC 104 includes a first processor and a second processor. The first processor continuously generates the first health status signal when the first processor determines the copy of the first packet is valid. Similarly, the second processor continuously generates the second health status signal when the second processor determines the second copy of the first packet is valid.

The active FSC 104 communicates the first and second health status signals to the system 100. The system 100 monitors the first and second health status signal to determine whether the active FSC 104 is healthy. For example, when the system 100 receives the first and second health status signals, the system 100 determines the active FSC 104 is healthy. Conversely, when the system 100 does not receive one of the first health status signal and the second health status signal, the system 100 determines the active FSC 104 is not healthy.

As will be discussed in detail below, the system 100 instructs the active FSC 104 to operate in a safe state in order to maintain the safety of the system 100. It is understood that while only voting mismatches are discussed in relation to the first and second status signals being de-asserted, any hardware or software failure within the system 100 may cause one of the first and second status signals to be de-asserted. The health status signal may indicate the system 100 is operating according to a predetermined operating standard. In this way, the health status signal indicates the system 100 is healthy.

When the active FSC 104 determines that the two copies of the first packet are not identical, the active FSC 104 determines a voting fault has occurred. The active FSC 104 generates a fault signal based on the determination that a voting fault has occurred. The fault signal is indicative of a detected fault within the system 100. The fault may be due to hardware or software failure within the system 100 or the external safety system. For availability reasons, if the active FSC 104 encounters a hardware or software failure, the system 100 forces the active FSC 104 to a predetermined safe state. The standby FSC 108 then operates as the active FSC.

Each of the active FSC 104 and the standby FSC 108 may include a plurality of communication links. The communication links include, but are not limited to, uplinks, downlinks, and a user interface. An uplink is a bi-directional communication channel to higher-level equipment. The higher-level equipment may be system hardware included in an overall system architecture. For example, the higher-level equipment may be components of a railway braking system of the railway system.

A downlink is a bi-directional communication channel to lower-level hardware. For example, the lower-level hardware may include switches and relays that communicate with the higher-level equipment. The downlinks may be implemented following any suitable hardware standard. For example, the downlinks may be implemented as RS-232, RS-422, RS-485, CAN, MVB, Ethernet, Ethernet HSR Ring, or other suitable technology. A user interface is an interface designed to allow a user of the system 100 to access the components and subsystems of the system 100. For example only, the user interface may implemented as a plurality of light emitting diodes (LEDs).

The communication links communicate with hardware components and software applications external to the system 100. Further, the system 100 is configured to receive input and communicate output to a field engineer. For example, the field engineer may selectively configure the system 100 by communicating with the a user interface of the system 100.

Each of the active FSC 104 and the standby FSC 108 are arranged to execute a health and safety application. For example, the active FSC 104 and the standby FSC 108 include a memory and a processor. The health and safety application may be software loaded into the memory of the active FSC 104 and the standby FSC 108. The health and safety application is then executed by the processor of the active FSC 104 and the standby FSC 108.

The health and safety application monitors and controls the active FSC 104 and the standby FSC 108. For example, the health and safety application generates a plurality of health signals. The plurality of health signals may include, but is not limited to, a module health signal and a mask signal. The health and safety application generates the plurality of signals based on a fault in active FSC 104, for example. The health and safety application is a functional safety subsystem designed to detect and respond to failures by forcing one of the active FSC 104 or the standby FSC 108 to the safe state.

It is understood that the health and safety application may include any safety applications executed on an external safety system. This may include ensuring the validity and safety of a set of data elements prior to the set of data elements being executed by the hardware and software of the railway system. The health and safety application is also configured to ensure the railway system operates in the predetermined safe state when the health and safety application detects a failure in the system 100.

Each of the active FSC 104 and the standby FSC 108 includes a processing subsystem. The active FSC 104 processing subsystem includes a master central processing unit (CPU) 116a and a checker CPU 120a. Similarly, the standby FSC 108 processing subsystem includes a master CPU 116b and a checker CPU 120b. Each of the master CPUs 116a and 116b are configured to be identical. Similarly, each of the checker CPUs 120a and 120b are configured to be identical. In this way, the master CPU 116a, the master CPU 116b, the checker CPU 120a, and the checker CPU 120b act to increase the availability and reliability of the system 100.

In order to monitor and control the overall health and safety of the system 100, the master CPU 116a and the checker CPU 120a are also configured to be identical. For example, the master CPUs 116a and the checker CPU 120a execute identical software and implement identical processing functions. The master CPU 116a and the checker CPU 120a are configured to perform identical functions in order to maintain full hardware fault and error detection coverage of the safety critical hardware and software and allow for voting on outgoing packets in the correct sequence.

In some implementations, the master CPU 116a receives a request to perform a task from at least one of the safety critical hardware or software of the railway system. The request to perform a task is based on a command received by the safety critical hardware and software from the operator of the external safety system. For example, the operator of the railway system may command a train riding on the railway system to increase speed. The operator may actuate a physical lever within the train. The physical lever is arranged to generate a signal indicative of the command to increase the speed of the train. The signal is communicated to the safety critical hardware and software.

Prior to executing the command, the safety critical hardware and software communicate the safety relevant task to the system 100. The system 100 is configured to interpret the signal and determine a requested task associated with the signal. The system 100 then determines whether the requested task is indicative of a safety relevant task. For example, the requested task may be a safety relevant task or a non-safety relevant task. In one example. a non-safety relevant task includes instructions that instruct the safety critical hardware and software to return a current status of the train operating within the railway system. In another example, a safety-relevant task includes instructions that instruct the safety critical hardware and software to increase the speed of the train.

The system 100 compares the requested task to a list of predefined tasks. The system 100 determines, based on the predefined tasks, whether the requested task is safety relevant. When system 100 determines the requested task is a safety relevant task, the system 100 generates a packet corresponding to the requested task. It is understood that while only a safety relevant task is described herein, the system 100 may generate a packet from any task. The system 100 communicates the packet to the master CPU 116a. Both the master CPU 116a and the checker CPU 120a are configured to verify the validity of the packet before the safety critical hardware and software execute the requested task. For example, the request to perform a task may be one of the plurality of incoming data packets.

Simultaneously, the checker CPU 120a receives a copy of the same packet corresponding to the requested task. Each of the master CPU 116a and the checker CPU 120a is configured to communicate a copy of the packet to the other of the master CPU 116a and the checker CPU 120a. Prior to the master CPU 116a instructing the safety critical hardware and software to perform the requested task, the master CPU 116a and the checker CPU 120a compare the packet received by each of the master CPU 116a and the checker CPU 120a. For example, the master CPU 116a and the checker CPU 120a perform 2oo2 voting on the packet.

When the packets are identical, the master CPU 116a instructs the safety critical hardware and software to perform the requested task. For example, the master CPU 116a and the checker CPU 120a generates an outgoing packet associated with the requested task. When voting is successful (i.e., the packets are identical) the master CPU 116a communicates the outgoing packet to the safety critical hardware and software to execute the requested task.

The outgoing packet may include operating data elements to control I/Os, a request to read an input in order to gather information, health messages, a request for inter-process communication, or other suitable requests associated with the safety critical hardware and software. The operating data elements may include a set of instructions that instruct one of the safety critical hardware and software to execute a predetermined procedure. For example, the operating data elements may instruct the safety critical software to execute an acceleration procedure. The acceleration procedure includes controlling at least one safety critical hardware component. The at least one hardware component includes a throttle mechanism of the train.

Conversely, when the packets are not identical, the master CPU 116a and the checker CPU 120a do not instruct the safety critical hardware and software to perform the requested task. The master CPU 116a generates a fault signal. The fault signal is indicative of a failure within the system 100, the safety critical hardware and software, or the external safety system. In this way, the master CPU 116a verifies that the requested task is a valid request from a valid source (i.e., an external hardware component or software application.)

For example only, the master CPU 116a receives erroneous requests to perform tasks due to external hardware failure, a software error, or an overall system malfunction. It is understood that while only the master CPU 116a and the checker CPU 120a are described, the principles described above also apply to the master CPU 116b and the checker CPU 120b.

Each of the active FSC 104 and the standby FSC 108 include a plurality of input/output unit (IOU) modules. The active FSC 104 includes IOU modules 128a-128f. The IOU modules 128a-128f will hereinafter be referred to as the IOU module 128. Similarly, the standby FSC 108 includes IOU modules 132a-132f, which are identical to the IOU modules 128a-128f. The IOU modules 132a-132f will hereinafter be referred to as the IOU module 132.

The active FSC 104 and the standby FSC 108 also each include a voting subsystem, an input/output (I/O) subsystem, and a switch module 124a and a switch module 124b respectively. The switch module 124a and the switch module 124b are configured to be identical. The switch module 124a and the switch module 124b route packets received from the I/O subsystem to the master CPUs 116a and 116b and the checker CPUs 120a and 120b.

For example, the switch module 124a may route a packet received from the master CPU 116a to an external network component. Further, the switch module 124a receives packets from an external component and routes the received packets to the master CPU 116a, the checker CPU 120b, and the I/O subsystem. Further, the switch module 124a communicates the received packets to the voting subsystem. It should be appreciated that while only the switch module 124a is described, the principles described above also apply to the switch module 124b.

The IOU module 128 implements the I/O subsystem within the active FSC 104. The I/O system is configured to provide a gateway between lower-level network equipment and the master CPU 116a and the checker CPU 120a. The IOU module 128 isolates the master CPU 116a and the checker CPU 120a from low level protocols required by external hardware and software. In this way, the IOU module 128 adds a safety layer on the internal Ethernet to support safe communication between the master CPU 116a, checker CPU 120a, and the external hardware and software. The IOU module 128 and the switch module 124a may be referred to collectively as the front blades 124a-128f. Similarly, the IOU module 132 and the switch module 124b may be referred to collectively as the front blades 124b-132f.

The active FSC 104 and the standby FSC 108 also include a plurality of rear transition modules (RTMs). The active FSC 104 includes RTMs 136a-136i. The standby FSC 108 includes RTMs 140a-140i. It should be appreciated that because the standby FSC 108 is a redundant configuration of the active FSC 104, the RTMs 136a-136i are identical to the RTMs 140a-140i. In some implementations, each of the RTMs 136a-136i may be hot swappable field replaceable units (FRUs).

For example, each of the RTMs 136a-136i may be removed and replaced by a field engineer without first having to power off the entire system 100. The RTMs 136a-136i allows the active FSC 104 to communicate with the external hardware and software components. For example, the RTM 136a electrically and logically couples the master CPU 116a to components external to the active FSC 104. Similarly, the RTM 136b electrically and logically couples the standby FSC 108 to external hardware and software components.

The front blades 124a-128f each includes a first memory location and a second memory location. The first and second memory locations store a value received from a corresponding hardware component of the active FSC 104. For example, the master CPU 116a continuously generates a module health signal (described above) indicative of the module health of the master CPU 116a. The master CPU 116a stores a 1 in the first memory location when the module health signal indicates the master CPU 116a is healthy.

Each of the front blades 124a-128f and the master CPU 116a generates a module health signal. Each of the front blades 124a-128f stores a value indicative of the module health signal in a first memory location. For example only, the switch module 124a stores a 1 in a first memory location associated with switch module 124a when the module health signal indicates the switch module 124a is healthy.

Conversely, the switch module 124a stores a 0 in the first memory location when the module health signal indicates the switch module 124a is not healthy. It is understood that while only the switch module 124a is described, the principles discussed herein apply to all modules within the system 100. It is further understood that while only storing a 1 and 0 based on the module health signal are described, any suitable indicator may be used to indicate the health of each of the modules within the system 100. Each of the modules within the system 100 then communicates the value stored in the associated first memory location to the master CPU 116a.

The master CPU 116a determines whether the active FSC 104 is healthy based on receipt of a plurality of values corresponding to the module health signals generated by each of the front blades 124a-128f and a module health signal generated by the master CPU 116a. For example only, the master CPU 116a determines that the active FSC 104 is healthy when each of the received values corresponding to the module health signals indicates that each of the modules within the system 100 is healthy. Conversely, the master CPU 116a determines that the active FSC 104 is not healthy when at least one of the received values corresponding to the module health signals indicates that at least one of the modules within the system 100 is not healthy.

In another implementation, a value indicative of the module health signal is stored in a module configured at the front of the system 100. For example, a module configured on the opposite side of the system 100 from the RTM 136s stores a 1 in the first memory location when the module health signal indications the master CPU 116a is healthy. It is understood that while only the master CPU 116a is described, the principles described herein apply to the checker CPU 120a.

The master CPU 116a receives a first packet of the plurality of incoming data packets. Simultaneously, the checker CPU 120a receives a copy of the first packet. The master CPU 116a and the checker CPU 120a determine whether the first packet and the copy of the first packet are identical. When the first packet and the copy of the first packet are identical, the master CPU 116a continuously generates a module health signal. The module health signal may be set to 1 or a high signal value. The value of the module health signal is indicative of the health of the active FSC 104. The master CPU 116*a* stores a 1 in the first memory location.

Conversely, when the first packet and the copy of the first packet are not identical, the master CPU 116*a* generates an invalid module health signal. For example, the master CPU 116*a* de-asserts the module health signal. The master CPU 116*a* stores a 0 in the first memory location. The master CPU 116*a* receives a mask signal indicative of the state of the mask register within the master CPU 116*a*. For example, the mask register is a programmable bit within each of the master CPU 116*a* and the checker CPU 120*a*.

The mask register is set when a requested task is a safety-relevant task. For example, the mask register is set to 1 when the system 100 determines the requested task is a safety-relevant task. The RTM 136*a* stores a 1 in the second memory location when the mask signal indicates the mask register within the master CPU 116*a* is set to a 1. Conversely, the RTM 136*a* stores a 0 in the second memory location when the mask signal indicates the mask register within the master CPU 116*a* is set to a 0.

The system 100 also includes a watchdog timer application. The watchdog timer application is a continuously running watchdog function that indicates whether the master CPU 116*a* is has stopped executing code. For example, the watch dog timer application monitors the master CPU 116*a*. The master CPU 116*a* generates a watchdog timer reset signal. The master CPU 116*a* communicates the watchdog timer reset signal to the watchdog timer application. The watchdog timer application determines whether the watchdog timer reset signal was received within a predefined period. For example, the predefined period may be 1 minute. The predefined period may be a configurable item.

The watchdog timer application generates a watchdog health signal based on the watchdog timer reset signal. For example, when the master CPU 116*a* communicates a watchdog timer reset signal after the predefined period, the watchdog timer application sets the watchdog health signal to 0. Conversely, when the master CPU 116*a* communicates the watchdog timer reset signal within the predefined period, the watchdog timer application sets the watchdog health signal to 1. In other words, the watchdog timer application determines a fault in the master CPU 116*a* when the master CPU 116*a* is incapable of communicating with the watchdog application within the predefined period. For example, the fault may be as a result of the master CPU 116*a* being stuck in a software loop. It is understood that while the only master CPU 116*a* is described above, the checker CPU 120*a* is configured to identical tasks as the master CPU 116*a*.

The RTM 136*a* communicates a module health value indicative of the overall health of the master CPU 116*a*. For example, the RTM 136*a* is configured to perform a logical OR on the value stored in the first memory location and the value stored in the second memory location. For example, when the value stored in the first memory location is 0 and when the value stored in the second memory location is 0 the RTM 136*a* will a communicate a module health value of 0.

When the value stored in the first memory location is 1 and the value stored in the second memory location is a 0, the RTM 136*a* communicates a module health value of 1. It is understood that each of the RTMs 136*a*-136*i* is configured to perform a logical OR on values stored within memory of associated with each of the front blades 124*a*-128*f*.

The RTMs 136*a* and 136*b* communicate a chassis health value to the safety relay box module 144. The safety relay box module 144 selectively determines which of FSCs within the system 100 will be the active FSC and which will be the standby FSC based on a plurality of chassis health values. For example, the safety relay box module 144 receives a plurality of chassis health values from the RTM 136*a*, RTM 136*b*, RTM 140*a*, and RTM 140*b*. The RTM 136*a* generates a first chassis health value based on the cumulative result of the module health signals generated by the master CPU 116*a* and the front blades 124*a*-128*f* and a value stored in the mask registers.

The RTM 136*a* communicates the chassis health value to the safety relay box module 144. Similarly, the RTM 136*b* generates a second chassis health value based the cumulative result of the module health signals generated by the checker CPU 120*a* and the front blades 124*a*-128*f* and a value stored in the mask registers. The RTM 140*a* generates a third chassis health value based on the cumulative result of the module health signals generated by the master CPU 116*b* and the front blades 124*b*-132*f* and a value stored in the mask registers. Similarly, the RTM 140*b* generates a fourth chassis health value based on the cumulative result of the module health signals generated by the checker CPU 120*b* and the front blades 124*b*-132*f* and a value stored in the mask registers.

The safety relay box module 144 determines which of the active FSC 104 and the standby FSC 108 will operate as an active FSC within the system 100. For example, the safety relay box module 144 determines the active FSC 104 will operate as the active FSC within the system 100 based the first-fourth chassis health values. The safety relay box module 144 determines the active FSC 104 will be the active FSC within the system 100 when the first and second chassis health signals indicate the active FSC 104 is healthy.

The safety relay box module 144 generates an active FSC signal and a standby FSC signal based on the active FSC determination. For example, the safety relay box module 144 generates a first active FSC signal and a second active FSC signal. The first and second active FSC signals are redundant signals that are both indicative of which FSC is elected to operate as the active FSC. The safety relay box module 144 also generates a first standby FSC signal and a second standby FSC signal.

The first and second standby FSC signals are redundant signals that are both indicative of which FSC was elected to operate as the standby FSC. The safety relay box module 144 communicates the first active FSC signal and the first standby FSC signal to the active FSC 104. Similarly, the safety relay box module communicates the second active FSC signal and the second standby FSC signal to the standby FSC 108.

The safety relay box module 144 also determines whether a fault has occurred in one of the active FSC 104 and the standby FSC 108 based on first-fourth chassis health signals. For example, the safety relay box module 144 determines a fault has occurred in the active FSC 104 when the safety relay box module 144 receives an invalid chassis health signal from one of the RTMs 136*a* and 136*b*. For example, an invalid chassis health signal may be a chassis health value of 0. The safety relay box module 144 generates a standby signal based on the invalid chassis health signal. The safety relay box module 144 communicates the standby signal to the active FSC 104. The active FSC 104 determines whether to enter the failsafe state based on the standby signal. For example, the active FSC 104 determines to enter the failsafe state when the active FSC 104 receives the standby signal.

The safety relay box module 144 generates an active signal based on the chassis health value. The safety relay box module 144 communicates the active signal to the standby FSC 108. The active signal indicates to the standby FSC 108 that the active FSC 104 is operating in the failsafe state or standby state. When the standby FSC 108 receives the active signal, the standby FSC 108 begins operating as the active FSC. In this way, the safety relay box module 144 forces a failed active FSC into a failsafe state, and alerts a standby FSC to assume the role of active FSC.

In some implementations, the safety relay box module 144 is configured to communicate with a plurality of commercial off the shelf (COTS) products. For example, the active FSC 104 and the standby FSC 108 may be COTS products implemented within the system 100. The active FSC 104 and the standby FSC 108 are configured according to a predetermined implementation standard. The implementation standard includes a predefined communication protocol.

The safety relay box module 144 is configured to receive and interpret signals and messages from the active FSC 104 and the standby FSC 108 according to the communication protocol. In this way, the safety relay box module 144 communicates with the active FSC 104 and the standby FSC 108 regardless of the physical characteristics of the active FSC 104 and the standby FSC 108 so long as the active FSC 104 and the standby FSC 108 follow the communication protocol. It is understood that the safety relay box module 144 communicates with any component within the system 100. Further, any component within the system 100 may be implemented utilizing COTS products so long as the any component follows the communication protocol.

In some implementations, the I/O subsystem also receives packets from external sources such as hardware and software components of the rail system. The received packets may include the plurality of incoming data packets as discussed above. The I/O subsystem then communicates the received packets to the voting subsystem.

The voting subsystem is a functional safety subsystem and is configured to detect and respond to failures. When the voting subsystem detects an error in one of the active FSC 104 and the standby FSC 108, the voting subsystem forces the one of the active FSC 104 and the standby FSC 108 to the failsafe state. The voting subsystem performs fault detection of the processing subsystem. For example, the master CPU 116a and the checker CPU 120a generate outgoing packets based on a requested task.

The voting subsystem compares the outgoing packets generated by the mater CPU 116a to the outgoing packets generated by the checker CPU 120a. When the outgoing packets are identical, the voting subsystem communicates a single copy of a packet to the switch module 124a and to the I/O subsystem. When the outgoing packets are not identical, the voting subsystem forces the active FSC 104 to the failsafe state. In this way, the voting subsystem detects faults in one of the active FSC 104 and the standby FSC 108. Upon detecting a fault in the one of the active FSC 104 and the standby FSC 108, the voting subsystem brings the system 100 to a safe state by forcing the faulty FSC to the failsafe state.

The voting subsystem also receives packets from the I/O subsystem. For example, the IOU modules 128 communicate with the voting subsystem via the switch modules 124a. The IOU modules 128 communicate a first packet to switch module 124a. The switch module 124a duplicates the first packet. For example, the switch module 124a generates a second packet. The second packet is a copy of the first packet. The switch module 124a communicates the first packet to the master CPU 116a and the checker CPU 120a. The master CPU 116a and the checker CPU 120a executing voting logic on the first and second packets as described above. In this way, the voting subsystem verifies the validity of the received packets.

In another example, the first packet may not be identical to the second packet due to a hardware malfunction in an external component, such as the safety critical hardware of the rail system. When the voting subsystem determines the first packet is not identical to the second packet, the safety application forces the active FSC 104 to the failsafe state. Additionally or alternatively, the mismatched packets may be silently discarded. For example, neither the master CPU 116a nor the checker 120a generates an outgoing packet based on the first and second packet. In this way, the system 100 may avoid excessive failover/failsafe transitions due to otherwise recoverable errors. In another implementation, input voting may be configured to result in failover/failsafe transition.

Figure 2:
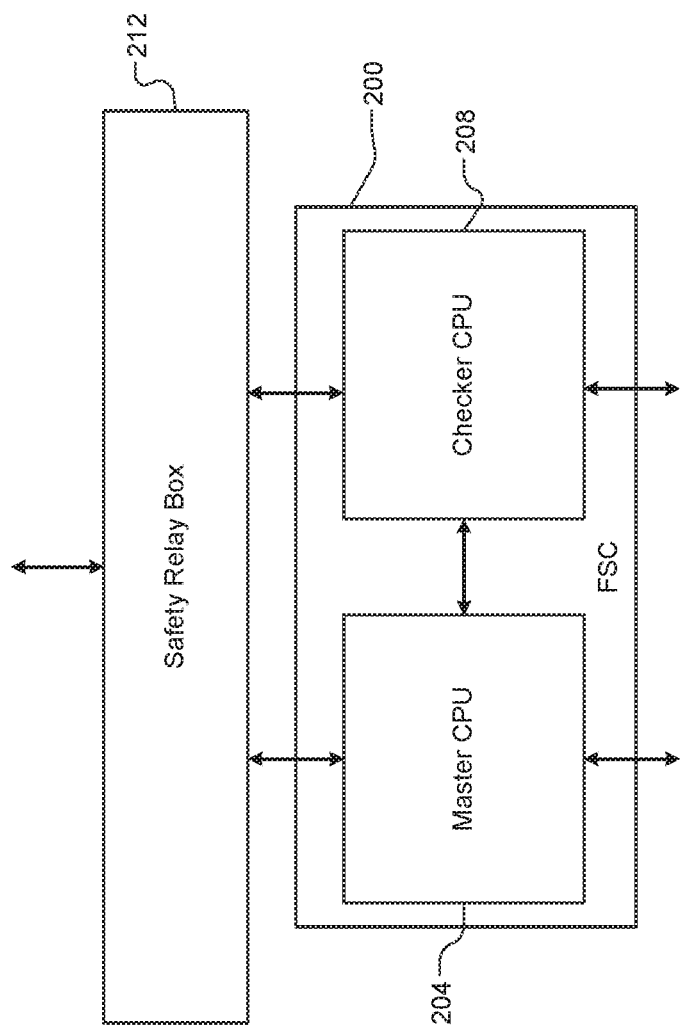
FIG. 2 is a functional block diagram of a fail-safe chassis according to the principles of the present disclosure.

Referring now to FIG. 2 a block diagram of an exemplary fail-safe chassis (FSC) according to the principles of the present disclosure is shown at 200. The FSC 200 includes a master CPU 204 and a checker CPU 208. The master CPU 204 and the checker CPU 208 execute identical software and implement identical processing functions. The master CPU 204 and the checker CPU 208 are configured to perform identical functions in order to maintain full hardware fault and error detection coverage of safety critical hardware and software.

For example, the master CPU 204 receives a request to perform a task from at least one of the safety critical hardware or software of an external safety system. The external safety system may be a system that is required to operate according to a predetermined safety standard, such as a railway system. The railway system includes safety critical hardware and software. The safety critical hardware and software interact with components of the railway system in order to control aspects of the railway system. For example, the safety critical hardware and software controls a train operating within the railway system.

The request to perform a task may include, but is not limited to, determining a status of a hardware component, engaging a brake of the railway system, or indicating to an operator of the railway system a location of a train operating within the railway system. The request to perform a task is received in the form of a packet. For example, the request to perform a task may be one of the plurality of incoming data packets.

Simultaneously, the checker CPU 208 receives a copy of the same request. Each of the master CPU 204 and the checker CPU 208 is configured to communicate a copy of the requested task to the other of the master CPU 204 and the checker 208. Prior to the master CPU 204 performing the requested task, the master CPU 204 and the checker CPU 208 compare the requested task received by each of the master CPU 204 and the checker CPU 208.

When the requested tasks are identical, the master CPU 204 and the checker CPU 208 communicate the requested task to the safety critical hardware and software. For example, the master CPU 204 and the checker CPU 208 generates an outgoing packet associated with the requested task. The outgoing packet includes operating data elements. The operating data elements may include a set of instructions that instruct one of the safety critical hardware and software to execute a predetermined procedure. For example, the operating data elements may instruct the safety critical software to execute a brake engaging procedure. The brake engaging procedure includes controlling at least one safety critical hardware component. The at least one hardware component may include a brake mechanism of the railway system.

Conversely, when the requested tasks are not identical, the master CPU 204 and the checker CPU 208 do not communicate the requested task to the safety critical hardware and software. In this way, the master CPU 204 verifies that the requested task is a valid request from a valid source (i.e., an external hardware component or software application.) For example only, the master CPU 204 receives erroneous requests to perform tasks due to external hardware failure, a software error, or an overall system malfunction.

The master CPU 204 and the checker CPU 208 include a mask register. The mask register is a programmable bit within the master CPU 204 and the checker CPU 208. A value stored in the mask register is indicates whether a requested task is a safety-relevant task. For example, the mask register is set to 1 when the system 100 determines a requested task is a safety-relevant task. Further, the health and safety application sets the mask register when the system 100 is initially started.

The master CPU 204 and checker CPU 208 each continuously generate a module health signal based on a determination of whether the requests tasks are identical. When the master CPU 204 and the checker CPU 208 determine the requested tasks are identical, the master CPU 204 and the checker CPU 208 continuously generate the module health signal pulse. When the master CPU 204 and the checker CPU 208 determine the requested tasks are not identical, the master CPU 204 and the checker CPU 208 de-assert the module health signal pulse.

The master CPU 204 and the checker CPU 208 generate a chassis health signal pulse based on a plurality of module health signal pulse generated by each of a plurality of modules associated with the FSC 200. The FSC 200 includes similar features as those described with respect to the active FSC 104. For example, the FSC 200 includes the front blades 124a-128f as described above. Each of the modules within the FSC 200 continuously generates a module health signal (as described above). The master CPU 204 generates a first chassis health signal pulse when the plurality of module health signals indicates the FSC 200 is healthy. In other words, the first chassis health signal pulse is continuously asserted (i.e., set to 1) when the mask register indicates the requested task is safety relevant and the plurality of module health signals indicate the FSC 200 is healthy.

It is understood that when the mask register indicates the requested task is not safety relevant (i.e., the mask register is set to 0) the first module health signal pulse may be de-asserted. However, safety relevant procedures (i.e., forcing the active FSC 204 to a safe state) will not be executed. In this way, failover/failsafe procedures are only implemented when a fault occurs during a safety relevant task. The chassis health signal pulse is indicative of the overall health of the FSC 200.

It is understood that principles described with respect to the master CPU 204 apply to the checker CPU 208. The checker CPU 208 generates a second chassis health signal pulse based on a plurality of module health signal pulse generated by each of a plurality of modules associated with the FSC 200. The checker CPU 208 continuously generates the second chassis health signal pulse when the plurality of module health signals indicates the FSC 200 is healthy. The master CPU 204 communicates a first chassis health signal pulse to a safety relay box 212. Similarly, the checker CPU 208 communicates a second chassis health signal pulse to a safety relay box 212.

The safety relay box module 212 selectively determines whether the FSC 200 will operate as an active FSC based on a plurality of chassis health signals. For example, the safety relay box module 212 begins receiving a chassis health signal pulse from the master CPU 204 when the FSC 200 is initiated. The safety relay box 212 also begins receiving a chassis health signal pulse from the checker CPU 208. The safety relay box module 212 determines whether the FSC 200 will be elected as the active FSC based on the chassis health signals.

In some implementations, the safety relay box module 212 also receives a plurality of chassis health signal pulses from another FSC. The safety relay box module 212 determines whether the FSC 200 or the other FSC will be elected as the active FSC based on the plurality of chassis health signal pulses. For example, the safety relay box module 212 first determines whether one of the FSC 200 or the other FSC is healthy. The safety relay box module 212 determines the FSC 200 is healthy when the chassis health signal pulses received from the FSC 200 indicate the FSC 200 is healthy. For example, the safety relay box 212 determines the FSC 200 is healthy when the safety relay box 212 receives a chassis health signal from the FSC 200.

Similarly, the safety relay box module 212 determines the other FSC is healthy when the plurality of chassis health signal pulses received from the other FSC indicate the other FSC is healthy. When safety relay box module 212 determines that both of the FSC 200 and the other FSC are healthy, the safety relay box module 212 elects an active FSC based on which of the FSC 200 and the other FSC communicated one of the plurality of chassis health signal pulses first. For example, when the FSC 200 communicates a signal to the safety relay box module 212 before the other FSC communicates a signal to the safety relay box module 212, the safety relay box module 212 elects the FSC 200 as the active FSC.

The safety relay box module 212 monitors the health of the active FSC. For example, the safety relay box module 212 receives the first and second chassis health signal pulses from the FSC 200. The safety relay box module 212 determines whether a fault has occurred in the FSC 200 based on the first and second chassis health signal pulses. The safety relay box 212 determines a fault has occurred in the FSC 200 when at least one of the first and second chassis health signal pulses is indicative of a mismatch of the requested tasks. In other words, the safety relay box module 212 determines a fault has occurred when the safety relay box module 212 does not receive one of the first and second chassis health signal pulses.

The safety relay box module 212 generates a failsafe signal when the safety relay box module 212 determines a fault has occurred in the FSC 200. The safety relay box module 212 communicates the failsafe signal to the FSC 200. The FSC 200 determines whether to enter the safe state based on the failsafe signal. For example, the FSC 200 enters the safe state when the FSC 200 receives the failsafe signal. Conversely, the FSC 200 will continue to operate in the active FSC mode unless the FSC 200 receives a failsafe signal.

Alternatively, the FSC 200 may enter a standby state when the FSC 200 does not receive an active signal. The safety relay box module 212 communicates the active signal when the safety relay box module 212 determines the FSC 200 is to operate as the active FSC. The safety relay box module 212 continuously communicates the active signal to the FSC 200. When the safety relay box module 212 determines the FSC 200 is faulty, the safety relay box module 212 does not communicate an active signal to the FSC 200. The FSC 200 then operates in the standby state.

In some implementations, the plurality of chassis health signal pulses are implemented as dynamic pulse signals to eliminate undetected, latent failure modes. The safety relay box module 212 is configured to determine whether a pulse signal is stuck at 0 or stuck at 1. For example, the safety relay box 212 receives a first pulse signal from the master CPU 204. The safety relay box module 212 is configured to wait a predetermined period of time.

For example, the predetermined period of time may be a period corresponding to a time long enough for a dynamic pulse to reset. The safety relay box module 212 determines the first pulse signal is stuck when the first pulse signal has not been reset after the predetermined period. The safety relay box module 212 determines a fault in the master CPU 204 when then safety relay box module 212 determines the first pulse signal is stuck. The safety relay box module 212 generates a failsafe signal based on determining a fault in the master CPU 204.

Figure 3:
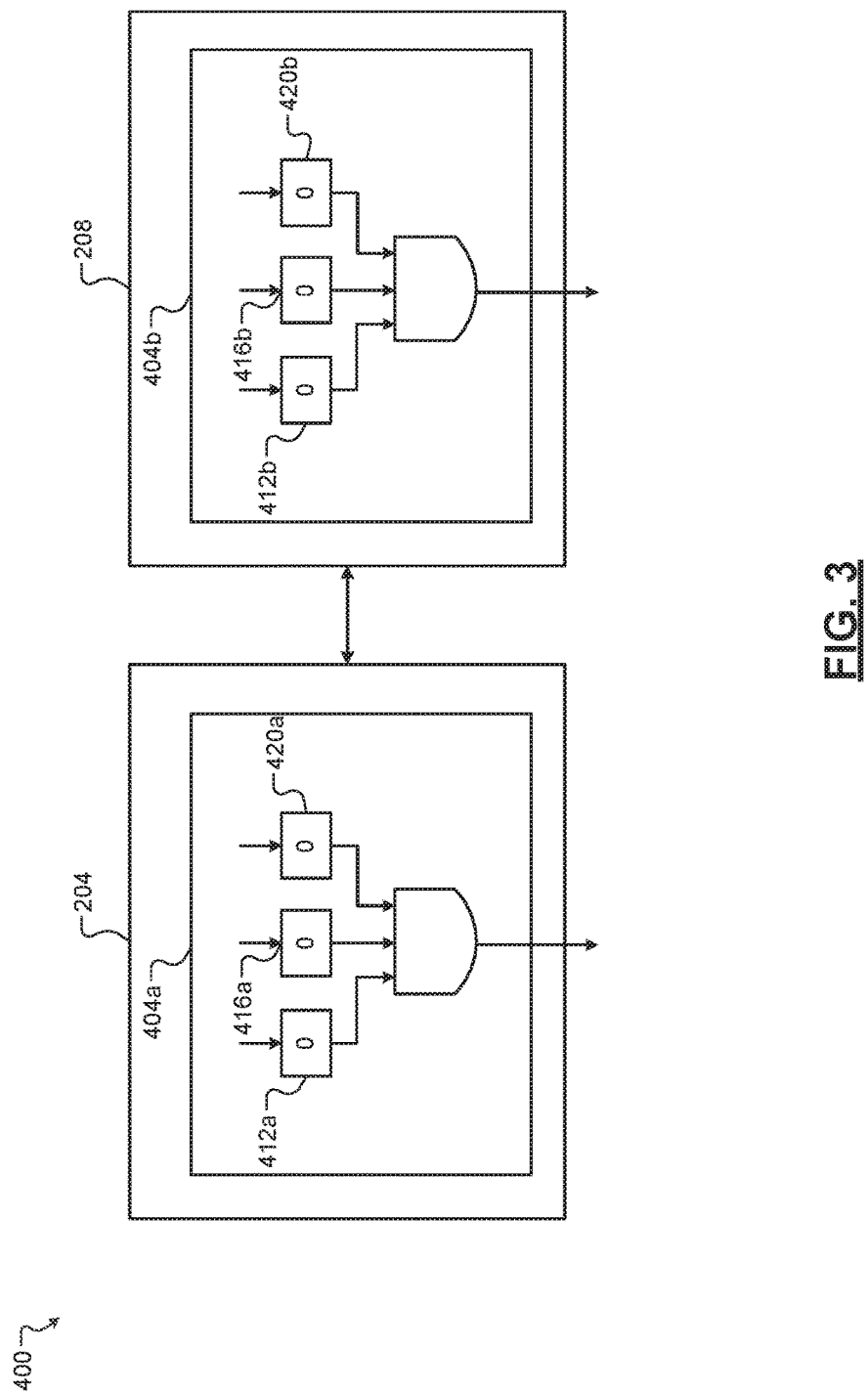
FIG. 3 is a function block diagram of a module health circuit according to the principles of the present disclosure.

Referring now to FIG. 3 an example module health system 400 is shown. In some embodiments, each module within an FSC includes a module health circuit. For example, the system 100 includes a health and safety subsystem as described above with respect to FIG. 1. The health and safety subsystem is a distributed subsystem. The health and safety subsystem is configured to detect faults in hardware and software associated with the system 100. The health and safety subsystem instructs an FSC within the system 100 to operate in the safe mode based on a detected fault. For example, the health and safety subsystem ensures a faulty FSC does not communicate with safety relevant hardware and software external to the system 100 when the health and safety subsystem detects a fault in the FSC.

The health and safety subsystem is configured to implement logic on each module and RTM pair within the system 100. For example, the health and safety subsystem implements hardware logic on the active FSC 104, the standby FSC 108, the master CPU 116, the checker CPU 120, the switch module 124, the IOU modules 128 and 132, the RTMs 136 and 140, and the safety relay box module 144, the FSC 200, the master CPU 204, and the checker CPU 208.

In some implementations, the hardware logic implemented on each of the above mentioned modules includes a module health circuit. Module health is at the root of the health and safety subsystem. It is protected against both functional and transient single points of failure with both spatial and temporal redundancy schemes.

By way of non-limiting example, FIG. 3 depicts the master CPU 204 and the checker CPU 208 (FIG. 2). It is understood that while only the master CPU 204 and checker CPU 208 are described herein, a module health circuit may be implemented on each module within the system 100. The master CPU 204 includes a module health circuit 404a. The module health circuit 404a includes a plurality of element health registers. For example, the module health circuit 404a includes a hardware (HW) register 412a, an application register 416a, and a watchdog (WD) timer register 420a.

Each of the element health registers may be implemented as a programmable bit. Each of the element health registers is programmed to an initial state. For example, each of the element health registers is programmed to a first value. During operation of the system 100, each of the element health registers may be programmed to a second value as will be discussed in greater detail below.

In some implementations, the HW register 412a is cleared (i.e., set to 0) when the system 100 is powered on. The system 100 executes a power on self-test (POST) when then system 100 is powered on. The POST is a process performed by firmware integrated within the system 100.

The POST performs a plurality of self-diagnostics tests on the master CPU 204. For example, a first test of the plurality of self-diagnostics test may include storing a predetermined value in a plurality of memory locations. The POST then compares the value stored in each of the plurality of memory locations with a predetermined expected value. When the POST determines the value stored in each of the memory locations is equal to the expected value, the POST determines the master CPU 204 passed the first test.

Conversely, when the POST determines the value stored in at least one of the plurality of memory locations is not equal to the expected value, the POST determines the master CPU 204 failed the first test. It is understood that the POST may run a plurality of tests on the master CPU 204. The first test is described above by way of non-limiting example. The POST sets the HW register 412a when the POST determines the master CPU 204 has passed the plurality of tests executed by the POST. The POST sets the HW register 412a to 1. The HW register 412a remains set to 1 until a subsequent restart of the system 100.

The application register 416a is cleared (by way of non-limiting example, the application register 416a may be set to 0) when the system 100 is initialized. For example, when the system 100 is restarted, the application register 416a is set to 0. The application register 416a is then selectively programmed by a software application external to the system 100. In some implementations, the software application is control software associated with the railway system (see FIG. 1). For example, the software application controls inputs and outputs of the railway system.

The software application is configured to execute a plurality of diagnostic procedures on the railway system. The software application may determine whether railway system is ready for safe operation based on the plurality of diagnostic procedures. For example only, the software application may perform a network communication test. The network communication test includes generating a network test packet. The software application instructs the railway system to transmit the network test packet over a network communication link.

If the transmission is successful, the software application determines the railway system passed the network communication test. Further, when the transmission is unsuccessful, the software application determines the railway system failed the network communication test. It is understood that while only a network communication test is described, the software application runs a plurality of tests on the railway system. The software application determines whether or not the railway system has passed or failed each of the plurality of tests.

The software application may determine a ratio of pass tests to failed tests. In this manner, the software application determines a diagnostic test pass percentage of the railway system. The software application determines whether the railway system is ready for safe operation (i.e., healthy) based on whether the pass percentage is above a pass threshold. It is understood that the pass threshold may be 100% (i.e., any single failure causes the software application to determine the railway system is not ready for safe operation) or any predetermined percentage.

The software application selectively programs the application register 416a based on whether the railway system is healthy. For example, when the software application determines the pass percentage is greater than the pass threshold, the software application determines the railway system is healthy. The software application sets the application register 416a to 1. Conversely, when the pass percentage is less than the pass threshold, the software application determines the railway system is unhealthy. The software application sets the application register 416a to 0.

The software application continuously monitors the railway system for faults. The software application continuously programs the application register 416a based on whether a fault has occurred. For example, the software application determines a fault has occurred (i.e., unhealthy) when the software application detects a memory error within the system 100. The software application sets the application register 416a to 0.

When the software application determines no fault has occurred (i.e., healthy) the software application sets the application register 416a to 1. It is understood that the software application is external to the system 100. It is further understood that the software application may determine whether the railway system is healthy in any suitable manner in addition to, or alternatively from, the methods described herein.

The WD timer register 420a is cleared (by way of non-limiting example, the application register 416a may be set to 0) when the system 100 is initialized. For example, when the system 100 is restarted, the WD timer register 420a is set to 0. The WD timer register 420a is then programmed by a watchdog timer application. The watchdog timer application monitors the master CPU 204. The master CPU 204 generates a watchdog timer reset signal. The master CPU 204 communicates the watchdog timer reset signal to the watchdog timer application. The watchdog timer application determines whether the watchdog timer reset signal was received within a predefined period. For example, the predefined period may be 1 minute or any other suitable period.

The watchdog timer application selectively programs the WD timer register 420a based on a determination that a fault has occurred in the master CPU 204. For example, when the master CPU 204 communicates a watchdog timer reset signal after the predefined period, the watchdog timer application determines a fault has occurred in the master CPU 204. The watchdog timer application then sets the WD timer register 420a to 0. Conversely, when the master CPU 204 communicates the watchdog timer reset signal within the predefined period, the watchdog timer application does not determine a fault has occurred in the master CPU 204. The watchdog timer application then sets the WD timer register 420a to 1.

In other words, the watchdog timer application determines a fault has occurred in the master CPU 204 when the master CPU 204 is incapable of communicating with the watchdog application within the predefined period. The fault may be as a result of the master CPU 204 being stuck in a software loop. For example only, the master CPU 204 may be incapable of processing subsequent tasks in a sequence of tasks. It is understood that while only the master CPU 204 is described above, the checker CPU 208 is configured to identical tasks as the master CPU 204.

The module health circuit 404a continuously generates (i.e., asserts) a module health signal based on a value stored in each of the HW register 412a, the application register 416a, and the WD timer register 420a. The module health signal indicates whether the master CPU 204 is healthy. The module health signal is described in greater detail in FIGS. 1 and 2.

The module health circuit 404a determines a value stored in each of the HW register 412a, the application register 416a, and the WD timer register 420a. When the value stored in each of the HW register 412a, the application register 416a, and the WD timer register 420a is 1, the module health circuit 404a continuously generates the module health signal. When at least one of the values stored in each of the HW register 412a, the application register 416a, and the WD timer register 420a is 0, the module health circuit 494 de-asserts the module health signal. The module health circuit 404a communicates the module health signal to the master CPU 204.

The module health circuit 404a determines a value stored in each of the HW register 412a, the application register 416a, and the WD timer register 420a. When the value stored in each of the HW register 412a, the application register 416a, and the WD timer register 420a is 1, the module health circuit 404a continuously generates the module health signal. When at least one of the values stored in each of the HW register 412a, the application register 416a, and the WD timer register 420a is 0, the module health circuit 404 de-asserts the module health signal. The module health circuit 404a communicates the module health signal to the master CPU 204

As described with reference to FIG. 2, the master CPU 204 generates the first chassis health signal based on a receiving a plurality of module health signals. For example, the master CPU 204 receives a module health signal from a module health circuit implemented on each of the modules within the system 100. The master CPU 204 generates the first chassis health signal based on each of the module health signals. The master CPU 204 communicates the first chassis health signal to the safety relay box 212.

While the master CPU 204 and the checker CPU 208 are configured to be identical, as an added safety check, the checker CPU 208 includes a module health circuit 404b. The module health circuit 404b includes a plurality of element health registers. For example, the module health circuit 404b includes a hardware (HW) register 412b, an application register 416b, and a watchdog (WD) timer register 420b.

The module health circuit 404b continuously generates (i.e., asserts) a module health signal based on a value stored in each of the HW register 412b, the application register 416b, and the WD timer register 420b. The module health signal indicates whether the checker CPU 208 is healthy. The module health signal is described in greater detail in FIGS. 1 and 2.

The module health circuit 404b determines a value stored in each of the HW register 412b, the application register 416b, and the WD timer register 420b. When the value stored in each of the HW register 412b, the application register 416b, and the WD timer register 420b is 1, the module health circuit 404b continuously generates the module health signal. When at least one of the values stored in each of the HW register 412b, the application register 416b, and the WD timer register 420b is 0, the module health circuit 404b de-asserts the module health signal. The module health circuit 404b communicates the module health signal to the checker CPU 208

As described with reference to FIG. 2, the checker CPU 208 generates the second chassis health signal based on a receiving a plurality of module health signals. For example, the checker CPU 208 receives a module health signal from a module health circuit implemented on each of the modules within the system 100. The master CPU 208 generates the second chassis health signal based on each of the module health signals. The checker CPU 208 communicates the second chassis health signal to the safety relay box 212.

Figure 4:
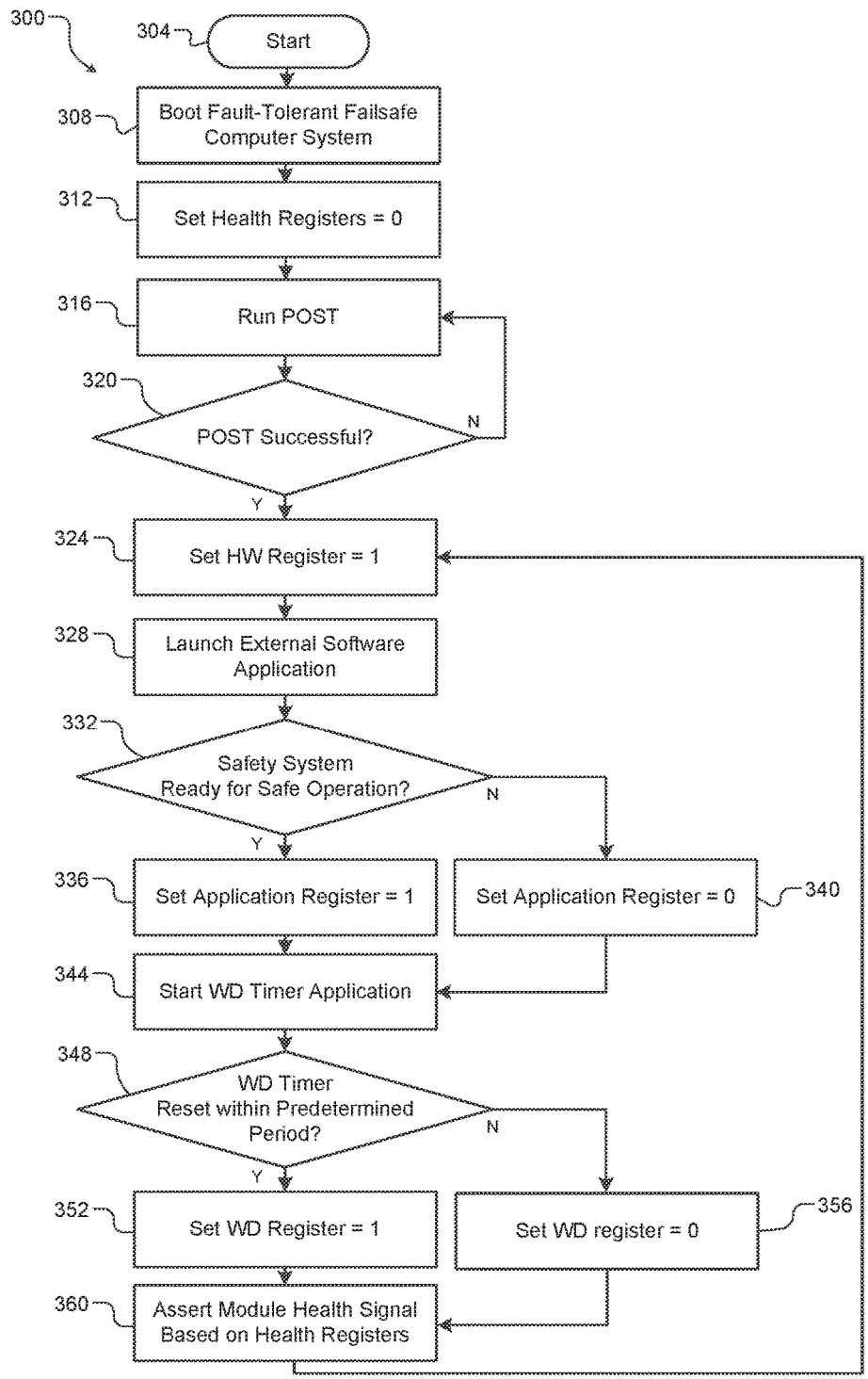
FIG. 4 is a flow diagram illustrating a module health method according to the principles of the present disclosure.

Referring now to FIG. 4 a method 300 for implementing a module health circuit begins at 304. At 308, the method 300 initializes a fault-tolerant failsafe computer system. For example, the fault-tolerant failsafe computer system may be the system 100. At 312, the method 300 sets a plurality of health registers to 0. The plurality of health registers include the HW register 412a, the application register 416a, and the WD timer register 420a. At 316, the method 300 executes a power on self-test (POST).

At 320, the method 300 determines whether the POST was successful. If true, the method 300 continues at 324. If false, the method 300 continues at 316. At 324, the method 300 sets the HW register to 1. At 328, the method 300 launches an external software application associated with a safety critical system. For example, the external software application may be the software application associated with the railway system as described with reference to FIG. 3. At 332, the method 300 determines whether the safety critical system is ready for safe operation. If true, the method 300 continues at 336. If false, the method 300 continues at 340.

At 340, the method 300 sets the application register 416a to 0. The method 300 continues at 344. At 336, the method 300 sets the application register 416a to 1. At 344, the method 300 starts the watchdog (WD) timer application. At 348, the method 300 determines whether the WD timer was reset within the predetermined period. If true, the method 300 continues at 352. If false, the method 300 continues at 356. At 356, the method 300 sets the WD timer register 420a to 0. The method continues at 360. At 352, the method 300 sets the WD timer register to 1. At 360, the method 300 asserts the module health signal based on the HW register 412a, the application register 416a, and the WD timer register 420a. The method 300 ends at 352.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A module health system comprising:
   a master CPU including:
   a module health circuit that includes:
      a first hardware (HW) register that is set to a first value in response to the system starting;
      a first application register that is set to the first value in response to the system starting;
      a first watchdog (WD) timer register that is set to the first value in response to the system starting;
      a first power on self-test (POST) that determines whether the system has passed a plurality of tests and that selectively sets the first HW register to a second value based on the determination;
      an external software application that determines whether a safety critical system external to and associated with the module health circuit is healthy and selectively sets the first application register based on the determination;
      a watchdog timer application that selectively sets the first WD timer register in response to receiving a watchdog signal; and
      a first central processing unit (CPU) that determines whether to de-assert a first module health signal based on the values of the first HW register, the first application register, and the first WD timer register; and
   a checker CPU including a second module health circuit, wherein the master CPU and the checker CPU each output respective health signals, and the respective health signals are compared to determine whether the module health system is operating properly.

2. The system of claim 1 wherein the POST sets the first HW register to the second value when the POST determines the system passed the plurality of tests.

3. The system of claim 1 wherein the POST does not set the HW register to the second value when the POST determines the system did not pass at least one of the plurality of tests.

4. The system of claim 1 wherein the software application sets the first application register to the second value when the software application determines the safety critical system is healthy.

5. The system of claim 1 wherein the software application does not set the first application register to the second value when the software application determines the safety critical system is not healthy.

6. The system of claim 1 wherein the watchdog timer application sets the first WD timer register to the second value when the watchdog timer application receives a watchdog timer signal within a predetermined period and wherein the watchdog timer application does not set the first WD timer register to the second value when the watchdog timer application does not receive the watchdog timer signal within the predetermined period.

7. The system of claim 1 wherein the first CPU determines not to de-assert the first module health signal when each of the first HW register, the first application register, and the first WD timer register are set to the second value.

8. The system of claim 1 wherein the first CPU determines to de-assert the first module health signal when at least one of the first HW register, the first application register, and the first WD timer register is set to the first value.

9. The system of claim 1 wherein the first CPU determines whether to de-assert a first chassis health signal in response to the determination of whether to de-assert the first module health signal.

10. The system of claim 1 further comprising a second CPU that determines whether to de-assert a second module health signal based on a value of a second HW register, a second application register, and a second WD timer register, wherein the second CPU determines whether to de-assert a second chassis health signal in response to the determination of whether to de-assert the second module health signal.

11. A method comprising:
in a master CPU:
setting, in response to a module health system starting, a hardware (HW) register to a first value;
setting, in response to the system starting, an application register to the first value;
setting, in response to the system starting, a watchdog (WD) timer register;
selectively setting the HW register to a second value in response to a determination of whether the system has passed a plurality of tests;
selectively setting the application register to the second value in response to a determination of whether a safety critical system external to and associated with the module health system is healthy;
selectively setting the WD timer register to the second value in response to receiving a watchdog signal; and
determining whether to de-assert a module health signal based on a value of the HW register, the application register, and the WD timer register; and
in a checker CPU, providing a second module health circuit,
wherein the master CPU and the checker CPU each output respective health signals, and the respective health signals are compared to determine whether the module health system is operating properly.

12. The method of claim 11 further comprising setting the HW register to the second value in response to a determination that the system passed the plurality of tests.

13. The method of claim 11 further comprising not setting the HW register to the second value in response to a determination that the system did not pass at least one of the plurality of tests.

14. The method of claim 11 further comprising setting the application register to the second value in response to a determination that the safety critical system is healthy.

15. The method of claim 11 further comprising not setting the application register to the second value in response to a determination that the safety critical system is not healthy.

16. The method of claim 11 further comprising setting the WD timer register to the second value in response to receiving the watchdog signal within a predetermined period.

17. The method of claim 16 further comprising not setting the WD timer register to the second value in response to not receiving a watchdog timer signal within the predetermined period.

18. The method of claim 11 further comprising determining not to de-assert the module health signal when each of the HW register, the application register, and the WD timer register are set to the second value.

19. The method of claim 11 further comprising determining to de-assert the module health signal when at least one of the HW register, the application register, and the WD timer register is set to the first value.

20. The method of claim 11 further comprising determining whether to de-assert a chassis health signal in response to the determination of whether to de-assert the module health signal.

21. A module health system comprising:
a module health circuit that includes:
a first hardware (HW) register that is set to a first value in response to the system starting;
a first application register that is set to the first value in response to the system starting;
a first watchdog (WD) timer register that is set to the first value in response to the system starting;
a first power on self-test (POST) that determines whether the system has passed a plurality of tests and that selectively sets the first HW register to a second value based on the determination;
an external software application that determines whether a safety critical system external to and associated with the module health circuit is healthy and selectively sets the first application register based on the determination;
a watchdog timer application that selectively sets the first WD timer register in response to receiving a watchdog signal; and
a first central processing unit (CPU) that determines whether to de-assert a first module health signal based on the values of the first HW register, the first application register, and the first WD timer register.

22. The system of claim 21 wherein the POST sets the first HW register to the second value when the POST determines the system passed the plurality of tests.

23. The system of claim 21 wherein the POST does not set the HW register to the second value when the POST determines the system did not pass at least one of the plurality of tests.

24. The system of claim 21 wherein the software application sets the first application register to the second value when the software application determines the safety critical system is healthy.

25. The system of claim 21 wherein the software application does not set the first application register to the second value when the software application determines the safety critical system is not healthy.

26. The system of claim 21 wherein the watchdog timer application sets the first WD timer register to the second value when the watchdog timer application receives a watchdog timer signal within a predetermined period and wherein the watchdog timer application does not set the first WD timer register to the second value when the watchdog timer application does not receive the watchdog timer signal within the predetermined period.

27. The system of claim 21 wherein the first CPU determines not to de-assert the first module health signal when each of the first HW register, the first application register, and the first WD timer register are set to the second value.

28. The system of claim 21 wherein the first CPU determines to de-assert the first module health signal when at least one of the first HW register, the first application register, and the first WD timer register is set to the first value.

29. The system of claim 21 wherein the first CPU determines whether to de-assert a first chassis health signal in response to the determination of whether to de-assert the first module health signal.

30. The system of claim 21 further comprising a second CPU that determines whether to de-assert a second module health signal based on a value of a second HW register, a second application register, and a second WD timer register, wherein the second CPU determines whether to de-assert a second chassis health signal in response to the determination of whether to de-assert the second module health signal.

\* \* \* \* \*